United States Patent
Gaida et al.

(10) Patent No.: US 7,209,293 B2
(45) Date of Patent: Apr. 24, 2007

(54) OPTICAL IMAGING SYSTEM HAVING AN EXPAND DEPTH OF FIELD

(75) Inventors: Gerhard Gaida, Aalen (DE); Hans-Joachim Miesner, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 189 days.

(21) Appl. No.: 10/923,004

(22) Filed: Aug. 23, 2004

(65) Prior Publication Data
US 2005/0041308 A1 Feb. 24, 2005

(30) Foreign Application Priority Data
Aug. 21, 2003 (DE) ............... 103 38 472

(51) Int. Cl.
*G02B 21/02* (2006.01)
*G02B 27/44* (2006.01)
(52) U.S. Cl. ............... 359/656; 359/362; 359/565
(58) Field of Classification Search ........ 359/565, 359/362, 656
See application file for complete search history.

(56) References Cited

U.S. PATENT DOCUMENTS

| 5,307,097 A | * | 4/1994 | Baker | 351/212 |
| 5,386,319 A | * | 1/1995 | Whitney | 359/575 |
| 5,748,371 A | | 5/1998 | Cathey, Jr. et al. | |
| 6,536,898 B1 | | 3/2003 | Cathey, Jr. | |
| 2005/0099682 A1 | * | 5/2005 | Lauer | 359/386 |
| 2005/0146790 A1 | * | 7/2005 | Liu et al. | 359/586 |

FOREIGN PATENT DOCUMENTS

WO WO 02/37157 5/2002

OTHER PUBLICATIONS

"Extended depth of field through wave-front coding", Dowski, Jr. et al. Applied Optics, vol. 35, No. 11, pp. 1859 to 1866 (1995).

\* cited by examiner

Primary Examiner—Scott J. Sugarman
(74) Attorney, Agent, or Firm—Walter Ottesen

(57) ABSTRACT

An optical imaging system, for example, for a surgical microscope (100) has a beam deflecting unit in order to cast light rays out of an object region (112) into an image plane (104) with an optical beam path. An optical phase plate (107) is mounted in the optical beam path. In the optical imaging system, a unit for generating a geometric image of the image plane is provided, for example, an ocular unit (105). The optical phase plate (107) is arranged on the end of the objective lens (101) facing away from the object or is arranged in a region of the optical imaging system in which the beam path is parallel.

48 Claims, 3 Drawing Sheets

OPTICAL IMAGING SYSTEM HAVING AN EXPAND DEPTH OF FIELD

CROSS REFERENCE TO RELATED APPLICATION

This application claims priority of German patent application no. 103 38 472.3, filed Aug. 21, 2003, the entire content of which is incorporated herein by reference.

FIELD OF THE INVENTION

The invention relates to an optical imaging system having a beam deflection unit in order to cast light rays from an object region into an image plane. The optical imaging system further includes an optical phase plate which is mounted in the optical beam path.

BACKGROUND OF THE INVENTION

An optical phase plate is hereinafter understood to be an optical element which is permeable to light and imparts a phase offset to a light beam passing therethrough. The phase offset is dependent upon the location of the pass-through of the light beam through the optical element.

Optical imaging systems (for example, in cameras or microscopes) image an object region into an image plane via lens systems. As a rule, in such apparatus, the position of the image plane with reference to a lens system is constructively pre given and cannot be adjusted. Accordingly, for example, in a camera, a light-sensitive film is disposed in the image plane. The position of the film is fixed relative to the lens system in the camera. In a microscope, the position of the image plane is determined by a corresponding dimensioning of the microscope main objective and tube lenses and is, as a rule, likewise not adjustable.

Strictly speaking, in the model of the geometric optics, only such object points are sharply imaged from which light rays emanate which are so deflected by the lens system in the corresponding apparatus that these rays all intersect in a common image plane. Taken precisely, this pertains only to specific object points in an object plane. The position of these object points with reference to a primary plane of the lens arrangement is determined by the position of the image plane and the dimensioning of the lens system.

In the model of wave optics, an individual object point leads to a brightness distribution with finite expansion in the image plane. This image of the object points in the image plane is therefore basically limited with respect to diffraction. The form of the brightness distribution of an individual object point for a fixed image plane is dependent especially on the position of the object point with respect to an ideal object plane. For object points at a distance from the ideal object plane, there results a more expanded brightness distribution in the object plane than for object points which lie in the ideal object plane. The expansion of the brightness distribution can be reduced in that the aperture angle of the beam, which originates from an object point and impinges on the image plane, is reduced. This can be especially obtained by shading the geometric beam path. A shading of the geometric beam path leads, however, to a loss of image brightness. In this way, the depth of field of the optical image system can be improved because, in this way, also object points, which lie outside of an ideal object plane, are imaged with a comparatively low expanded brightness distribution. By shading the beam path, it is thereby possible to generate an image in the image plane which is only diffraction limited. The increase in depth of field achieved in this way can be estimated with the following formula:

$$\Delta z = C \times \lambda / [NA]^2,$$

wherein: C is an apparatus constant of the optical imaging system; $\lambda$ is the wavelength of the imaging light; and, NA is the numerical aperture of the imaging system.

It is known to introduce an apodizing mask into the beam path to improve the depth of field of an optical imaging system. Such an apodizing mask is a diaphragm having a diaphragm function which continuously changes in a peripheral region of the beam throughput between "throughput" and "total shading". The apodizing mask causes that the diffraction image, which is caused by an object point in the image plane, has an expanded primary maximum. At the same time, in this diffraction image, the secondary maxima are, however, formed with a corresponding lesser intensity. For object points, which are disposed in an ideal object plane, resolution capacity is thereby increased. At the same time, however, object points, which are disposed in the proximity of one such object plane, are imaged comparatively sharper. As for a simple shading of a beam path, with the use of an apodizing mask, the increase in depth of field is, however, obtained with a loss of image brightness.

The depth of field of optical imaging systems can be increased also by means of dynamic scan methods. For this purpose, an object region is digitally evaluated at different adjustments of the imaging system. In each case, the adjustment corresponds to a sharp imaging of different object planes. The detected image signals are then superposed to a depth-sharp total image. For a flicker-free image presentation, a very rapid data processing is, however, needed. The complexity with respect to computation is then very high for high image resolution.

An optical imaging system is described in the article of Dowski, Jr., et al entitled "Extended depth of field through wave-front coding", Applied Optics, volume 34 (1995), page 1859, and in U.S. Pat. No. 5,748,371. In this imaging system, an object region is imaged by means of a lens onto a CCD camera. At the object end, an optical phase plate is assigned to the lens. This optical phase plate is configured as a cubic phase plate. A spatially varying phase function is impressed upon the light passing through the cubic phase plate. This phase function causes a completely non-sharp object image in the image plane. This unsharp object image is detected by means of the CCD camera and is supplied in digital form to a computing unit for evaluation. In the computing unit, a depth-sharp image of the object region is computed from the imaged signals, which are detected by means of the CCD camera, and a known optical transfer function of the system. Here, it is utilized that the optical transfer function of the system has proven to be invariant to a good approximation relative to an offset of an object point of an image plane. The offset satisfies the geometric imaging conditions with respect to the image plane in which the CCD camera is mounted.

In U.S. Pat. No. 6,536,898 it is suggested to mount a phase plate on the human eye in order to so adjust the optical transfer function of this optical system that this transfer function is constant over a specific range away from the object. U.S. Pat. No. 6,536,898 explains in this context that a phase plate is realized via a suitable structuring of the cornea or of a contact lens. Alternatively, it is suggested in this U.S. Pat. No. 6,536,898 to implant a corresponding phase plate as an intraocular implant in the human eye.

An increase of the depth of field is desirable especially in surgical microscopes because the tissue, which is operated on by a surgeon, is, as a rule, filled with fissures. Here, it is therefore sought to make possible a sharp viewing for all regions of a surgical area. This is especially of significance in surgery on the eye because here several transparent tissues are present with the cornea, the pupil and the lens which lie one upon the other.

SUMMARY OF THE INVENTION

It is an object of the invention to provide an optical imaging system wherein the imaging of an uneven object region is made possible with a high depth of field and with the imaging system having the same image brightness as a geometrically ideally corrected imaging system.

This object is realized by an optical imaging system of the kind described initially herein wherein the imaging system includes a unit for generating a geometric image of the image plane and wherein the optical phase plate is arranged on the side of an objective lens facing away from the object or facing toward the object or wherein the optical phase plate is disposed in a region of the optical imaging system wherein the imaging beam path is parallel.

A unit for generating a geometric image of the image plane is understood herein to be any unit which images a first image, which lies in the image plane, into a second image in such a manner that the imaging from the first image to the second image is constructable with the laws of the geometric beam optics. A region having a parallel beam path in an optical imaging system is, for example, the region of an objective lens, which faces away from the object, and wherein the beam, which originates from the focal plane, has a parallel beam path.

In this way, a robust and simply configured optical imaging system is provided, which makes possible a viewing image having a large depth of field especially when used in light microscopes, for example, surgical microscopes, without there being a need for a complex signal processing.

Preferably, the optical phase plate is arranged in the entry pupil of the optical imaging system. In this way, an image field of the optical system can be maximized.

The increased depth of field is effected by the phase plate which leads to the situation that the optical transfer function of the corresponding system is essentially constant within a certain distance range from the image plane. This characteristic of the optical transfer function leads to the situation that the definition brightness of the point imaging function is essentially constant and equal to the definition brightness of the focal plane in a distance range $\Delta z$ from the focal plane or image plane. The definition brightness of the point imaging function is also referred to as the "Strehl ratio" and the geometric beam path is defocused in the distance range $\Delta z$. The definition brightness of a geometric-optical ideally-corrected optical system drops off very rapidly. For this reason, with a clever selection of the phase plate, the definition brightness of the system with phase plate can be greater in a defocused region than the definition brightness of the geometric-optical ideal optical system.

According to a further feature of the invention, the unit for generating a geometric image of the image plane is configured as a unit for generating an image on the ocular fundus of the viewing eye. In this way, a conventional ocular system can be used as a unit for generating a geometric image of the image plane in microscopes.

The optical phase plate causes the definition brightness H of the system over a range of the distance parameter $\psi$ to be greater than the definition brightness of the system without phase plate. Here, it is assumed that the system without phase plate is diffraction limited. An object end focal width and an object end numerical aperture are assumed to be equal. The definition brightness H is described in an article by Born et al published in "Principles of Optics", Pergamon Press 1970, pages 461 and 462. The definition brightness H is understood to be the ratio of the intensity $I_0$ in any desired point of a beam to the intensity I in the focal point of an ideal spherical wave of equal aperture.

In a further embodiment of the invention, the optical phase plate is configured as an optical phase plate which imparts a phase offset $\pi \leq \phi \leq 3\pi$ on the light beam passing through. In this way, an optical imaging system having a good compromise between image sharpness, image contrast and depth of field is provided.

According to a further embodiment of the invention, the optical phase plate is designed as a phase plate having a geometric phase deviation. An optical phase plate having a geometric phase deviation is understood to be a phase plate which imparts a spatially dependent phase $\phi$ to a light beam passing therethrough. This phase $\phi$ is expressed by the equation:

$$\phi = \alpha \times (x^k + y^k),$$

which is dependent upon the location (x, y) for the passthrough through the phase plate in a coordinate system referred to the optical axis of the optical imaging system, and wherein: $\alpha$ is a constant (preferably in the range $5 \leq \alpha \leq 30$) and k is a number with k>1 and wherein x and y are normalized position coordinates which satisfy the condition that, at the outer periphery of the light beam, which passes through the phase plate, the following applies: x=1 and y=1. In this way, an optical phase plate is provided which is optimized for a manufacturing process.

In a further embodiment of the invention, the optical phase plate is designed as a cubic phase plate.

A cubic phase plate is understood to be an optical phase plate which impresses a spatially varying phase $\phi$ upon a light beam, which passes through the phase plate, at a pass-through position (x, y) which is referred to the optical axis of the optical imaging system. The phase $\phi$ corresponds to the relationship:

$$\phi = \alpha \times (x^3 + y^3)$$

wherein: $\alpha$ is again a constant lying, for example, in the range $1 \leq \alpha \leq 30$, preferably $5 \leq \alpha \leq 30$.

In this way, optical phase plates can be used in the optical imaging system which can be manufactured with high accuracy.

In a further embodiment of the invention, the optical phase plate is made at least partially of glass. In this way, an optical imaging system is provided having a robust and an especially temperature-resistant optical phase plate.

According to another feature of the invention, the optical phase plate consists at least partially of plastic. In this way, optical phase plates can be used in the optical imaging system which can be cost-effectively manufactured.

In another embodiment of the invention, the optical phase plate consists at least partially of a glass substrate. In this way, phase plates can be used in the optical imaging system in which filter functions are simultaneously integrated, for example, an aberration filter function.

In a further embodiment of the invention, the optical phase plate includes a vaporized coating. In this way, an optical phase plate having a hardened surface can be provided.

In another embodiment of the invention, a vaporized coating varies locally in thickness on the optical phase plate. The vaporized coating on the optical phase plate effects thereby a phase shift function. In this way, the phase shift of the optical phase plate can be determined with high accuracy by adjusting the parameters of a vaporization process.

In another embodiment of the invention, the optical phase plate is at least partially comprised of an electrostatically deformable membrane. In this way, an optical imaging system is provided wherein a wanted depth of field can be easily adapted to the resolution of a unit for generating a geometric image and, if necessary, can be electrically controlled.

In another embodiment of the invention, the optical phase plate at least partially comprises a liquid crystal display. In this way, an optical imaging system is provided wherein the phase deviation, which is caused by the optical phase plate, can be adjusted electrically and therefore is easily controllable.

In another embodiment of the invention, the optical imaging system is integrated into a microscope, especially into a surgical microscope. The depth of field, which can be achieved with such an apparatus, can therefore be greatly improved by a simple insertion of an optical phase plate in the optical beam path.

In another embodiment of the invention, the optical resolution of the optical imaging system can be adapted to the resolution capacity of the human eye. An adaptation of the optical imaging system to the resolution capacity of the human eye is understood to mean that the optical imaging system is so designed that the magnitude of the brightness distribution of an imaging object point in the image plane is not perceived by a viewer because this brightness distribution cannot be resolved by the eye. In this way, an optical imaging system is provided wherein the depth of field is increased without a discernible negative effect on the imaging quality for the viewer.

In still another embodiment of the invention, the phase plate can be pivoted into and out of the beam path. In this way, a viewer can select between a viewing image which has a very high surface sharpness and a viewing image which has a high depth of field for a surface sharpness which is constant or slightly reduced under some circumstances without this being associated with a loss of brightness.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
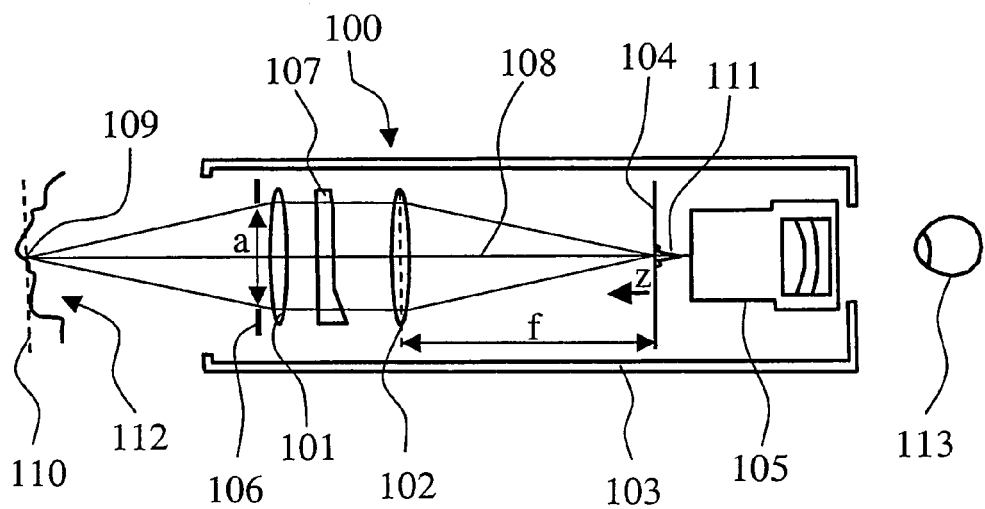
FIG. 1 is an optical imaging system having a phase plate in a surgical microscope.

FIG. 1 shows an optical imaging system of a surgical microscope 100. The optical imaging system includes a first objective lens 101 and a second objective lens 102 which are arranged in a microscope body 103. An intermediate image is generated in an image plane 104 by means of the first objective lens and the second objective lens in the microscope body 103. This intermediate image can be viewed with an ocular unit 105. For adjusting the aperture angle for the light rays, which originate from an object region 112, a diaphragm 106 is provided in the surgical microscope 100. The diaphragm 106 determines the entry pupil of the optical system. The surgical microscope 100 has an optical phase plate 107 which is arranged in a parallel imaging beam path between the first objective lens 101 and the second objective lens 102.

This optical phase plate 107 imparts a phase offset to the light rays which pass through the phase plate. The phase offset is dependent upon the location of the pass-through of the light rays. The phase plate 107 is configured as a cubic phase plate, that is, the relationship:

$$\phi = \alpha \times (x^3 + y^3)$$

is present between the phase offset $\phi$ and the location (x, y) of the pass-through of a light ray with the location being referred to the optical axis of the imaging system. In the above equation, $\alpha$ is a constant phase offset parameter.

The first objective lens 101, the second objective lens 102 and the optical phase plate 107 conjointly define a circularly-shaped boundary edge. Basically, the lenses as well as the optical phase plate could be configured in other boundary geometries. Especially, a rectangular boundary geometry of lenses or optical phase plates is possible.

As an alternative to the use of a cubic phase plate, it is also possible in the optical imaging system of the surgical microscope 100 to use phase plates which impart a phase offset to the light beam passing therethrough. The phase offset relates to the location of the passthrough through the phase plate functionally in another manner than is the case for a cubic phase plate.

The optical phase plate 107 is made of quartz glass having a refractive index n≈1.5. As an alternative to a configuration of the optical phase plate of quartz glass, it is also possible to utilize an optical phase plate made of plastic or an optical phase plate which essentially comprises a glass substrate.

For a phase offsetting characteristic, the optical phase plate can be coated with a vapor-deposition coating. There is also the possibility to use a liquid crystal display or an electrostatically deformable membrane in lieu of an optical phase plate. Also, the use of optical phase plates, which are made combined of quartz glass and plastic, and, under certain circumstances, also a liquid crystal display and/or an electrostatically deformable membrane can be used. If required, one or several vaporization-deposited coatings are provided.

The optical phase plate 107 can be switched into and out of the beam path in the optical imaging system of the surgical microscope 100.

The optical imaging system of the surgical microscope 100 further includes an ocular unit 105 which functions as a unit for generating a geometric image of an image plane 104 and a viewer having a viewer eye 113 can view the image plane 104 via the lens system 105a of the unit 105. The optical imaging system of the surgical microscope 100 images an object point 109 as a brightness distribution 111 in the image plane 104 which is the image end focal plane of the optical imaging system in the surgical microscope 100. The object point 109 is disposed in an ideal object plane which corresponds to the object-end focal plane 110 of the optical imaging system. A collection of object points in an object region 112 leads to an image in the image plane 104 which is put together from superposed brightness distributions. Different object points form the basis of corresponding ones of the brightness distributions. The ocular unit 105 together with the imaging requirement, which corresponds to the geometric ray optics, image a section of the image plane 104 and therefore image the there-present brightness distribution geometrically on the retina of a viewing eye in such a manner that the image from the image plane 104 is shown magnified to a viewer.

The optical imaging system of the surgical microscope 100 has a resolution capability which is adapted to the resolution capability of a human viewing eye. Here it is understood that the magnification of the ocular unit 105 for a viewing eye 113, which is adapted to infinity, is so selected that the expansion of a brightness distribution in the image plane 104 for an individual object point is not resolved by the viewing eye 113. The individual object point is disposed in the object-end focal plane of the lens system comprising a first objective lens 101 and a second objective lens 102. In this way, a basically finite expanded brightness distribution of an object point in the image plane 104 is still detected as an individual light point.

As an alternative to the use of an ocular unit, it is also possible to provide a camera which, for example, images the image plane 104 geometrically on a film or generates an image of an image in the image plane 104 in digital form by means of a CCD array or a comparable sensor.

With the optical phase plate 107, the diffraction image of an object point from an object region in the image plane 104 of the optical imaging system is changed.

Figure 2:
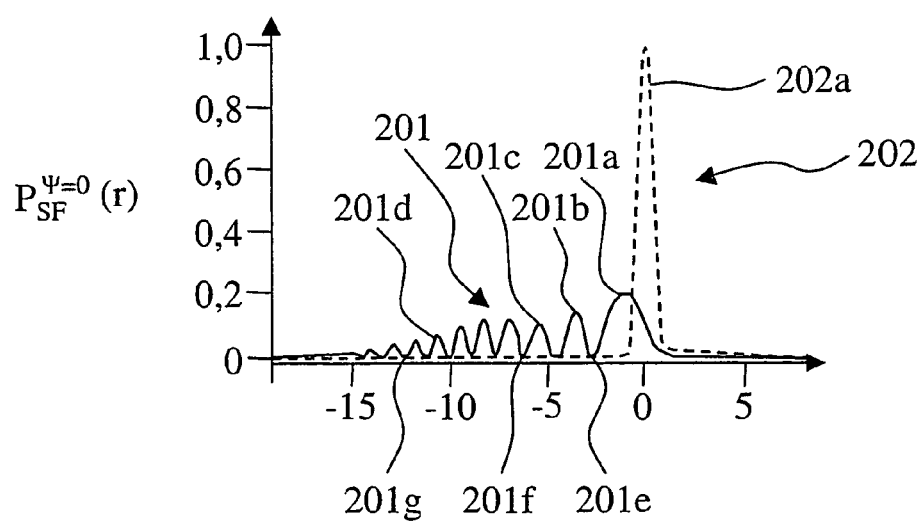
FIG. 2 is a point imaging function of an object point in an optical imaging system of FIG. 1 for a beam path having an optical phase plate and a beam path without an optical phase plate with the object point lying in an ideal object plane.

FIG. 2 shows mutually corresponding diffraction images of an object point which lies in the object-end focal plane of the optical imaging system in the surgical microscope 100 of FIG. 1. The diffraction images are shown in the form of the normalized point imaging function in dependence upon a normalized location $P_{SF}^{\psi=0}(r)$ in the image plane 104 of the optical imaging system in the surgical microscope 100 of FIG. 1 for the case of an optical phase plate, which is switched into the beam path, and for a beam path without an optical phase plate. The diffraction image 201 of an object point with an optical phase plate switched into the beam path differs from the corresponding diffraction image 202 without an optical phase plate in the beam path. When an optical phase plate is switched into the beam path, numerous secondary maxima 201b, 201c, 201d, et cetera are present in addition to a comparatively small primary maximum 201a. The secondary maxima are separated from each other by intensity minima. Furthermore, the primary maximum 201a of the diffraction image 201 with the optical phase plate is laterally offset with respect to the primary maximum 202a of the diffraction image 202 having an optical phase plate.

Figure 3:
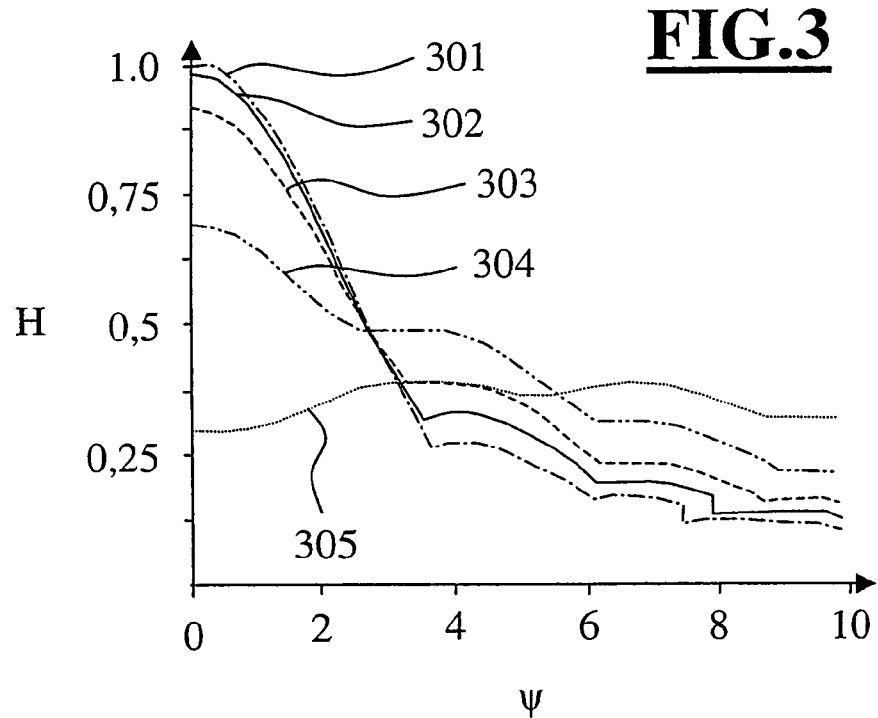
FIG. 3 is a graph showing the definition brightness of the point imaging function in an imaging system of FIG. 1 for a beam path with an optical phase plate for different phase offset parameters and a beam path without an optical phase plate.

In FIG. 3, the definition brightness H of the point imaging function in the imaging system of FIG. 1 is plotted in dependence upon the distance parameter:

$$\psi = \frac{2\pi}{\lambda}\left(\frac{a^2}{f}\right)z$$

and the various phase offset parameters α=0, that is, no phase plate, α=2, α=4, α=6 and α=8; wherein: z is the offset from the image plane 104 in FIG. 1 and a is the diameter of the diaphragm 106 and is therefore characterized as the effective objective diameter, f is the image-end focal length of the objective system of FIG. 1 which is defined by the objective lenses 101 and 102 and λ is the corresponding light wavelength.

The curve 301 corresponds to a system without a phase plate. For curve 302, the phase offset parameter is α=2 and in curve 303, α=4 and in curve 304, α=6 and in curve 305, α=8.

It has been shown that for ψ>4 (that is, in the more defocused image planes), the definition brightness H is greater than in an ideal optical system limited only with respect to diffraction. Because of the value H≧0.25 in this region, the image sharpness is nonetheless sufficiently large so that finest imaging structures can be recognized. In this way, when utilizing cubic phase plates with phase offset parameters 4, 6 and 8, defocused objects appear sharper than is the case for only diffraction limited imaging.

Figure 4:
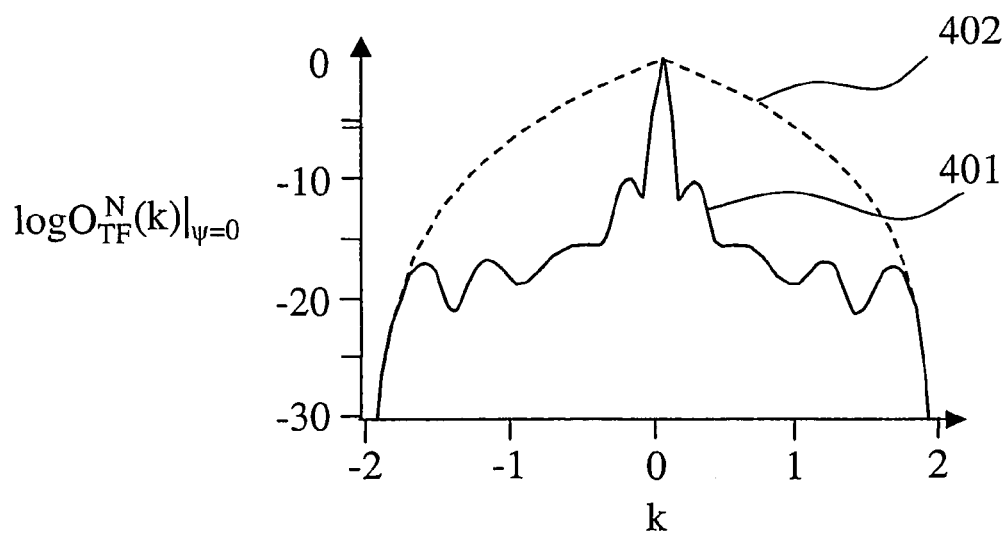
FIG. 4 is a graph showing the optical transfer function of an ideal object plane in an optical imaging system of FIG. 1 for a beam path having a phase plate and a beam path without a phase plate.

FIG. 4 shows the trace of the optical transfer function $O_{TF}^{N}(k)|_{\psi=0}$ for an object plane which corresponds to the object-end focal plane of the optical imaging system in the surgical microscope 100 of FIG. 1. The optical transfer function $O_{TF}^{N}(k)|_{\psi=0}$ is shown in dependence upon the normalized spatial frequency k in a logarithmic plot. The imaging of an object point in the optical imaging system of the surgical microscope 100 of FIG. 1 is characterized by means of the optical transfer function. The curve 401 corresponds to log $O_{TF}^{N}(k)|_{\psi=0}$ when an optical phase plate is switched into the beam path and the curve 402 corresponds to log $O_{TF}^{N}(k)|_{\psi=0}$ for a beam path in the optical imaging system in the surgical microscope 100 of FIG. 1 without a phase plate in the beam path.

For high spatial frequencies, the curve of log $O_{TF}^{N}(k)|_{\psi=0}$ (when there is no phase plate in the beam path) corresponds to the curve 401 of log $O_{TF}^{N}(k)|_{\psi=0}$ for a beam path with an optical phase plate. For low spatial frequencies, the curve 301 of log $O_{TF}^{N}(k)|_{\psi=0}$ has an oscillatory trace. The curve 401, however, exhibits no zero positions. This means that the introduction of a phase plate into the optical beam path basically only leads to a slight reduction of the image sharpness but does not have a loss as to data as a consequence for an imaging of a collection of object points from the object-end focal plane into the intermediate image plane.

In that the resolution of the ocular unit 105 in the surgical microscope 100 of FIG. 1 is adapted to the diffraction image of an object point in the image plane 104, a viewer does not perceive a negative effect as to image sharpness because of the optical phase plate 107.

Figure 5:
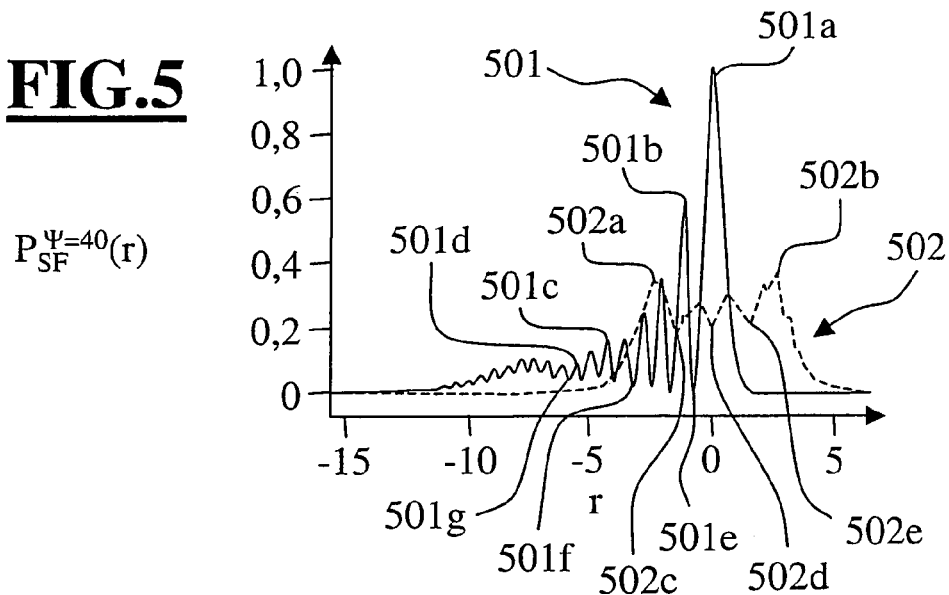
FIG. 5 is a graph showing the point imaging function of an object point in an optical imaging system of FIG. 1, which is spaced from an ideal object plane, for a beam path having an optical phase plate and a beam path without an optical phase plate.

The diffraction image of an object point, which is spaced from the object-end focal plane of the optical imaging system in the surgical microscope 100 of FIG. 1, is shown in FIG. 5 in the form of a normalized point imaging function corresponding to the graph of FIG. 2. The imaged object point is at a spacing $$\delta = 40 \frac{\lambda}{\pi [NA]^2}$$

from the focal plane; wherein $\lambda$ is the wavelength of the imaging light and NA is the image-end numerical aperture of the system. For an object point positioned in this manner, the curve 501 corresponds to the trace of the normalized point imaging function in dependence upon the normalized location $P_{SF}^{\psi=40}(r)$ when an optical phase plate is switched into the beam path. The curve 502 shows the trace of $P_{SF}^{\psi=40}(r)$ when the optical phase plate is switched out of the beam path. The curve 501 shows a pronounced primary maximum 501a and numerous secondary maxima 501b, 501c, 501d, et cetera, which are separated from each other by intensity minima 501e, 501f, 501g, et cetera. The amplitude of the primary maximum 501a is clearly greater than the amplitudes of the numerous secondary maxima 501b, 501c, 501d, et cetera. In contrast, in curve 502, and different from the curve 501, there is no global maximum; instead, there are two local maxima 502a and 502b, which are separated in distance from each other and are separated by local intensity minima 502c, 502d and 502e for which the brightness distribution does nonetheless not vanish. This means that the introduction of an optical phase plate in the beam path has the consequence that object points, which are disposed at a spacing from the focal plane, are imaged with a narrow brightness distribution and therefore are imaged sharply in the image plane 104 by the optical imaging system of the surgical microscope 100 of FIG. 1 notwithstanding a geometrically defocused imaging beam path.

For an object plane, which is spaced from the object-end focal plane of the optical imaging system in the surgical microscope 100 of FIG. 1 by $$\delta = 40 \frac{\lambda}{\pi [NA]^2},$$

Figure 6:
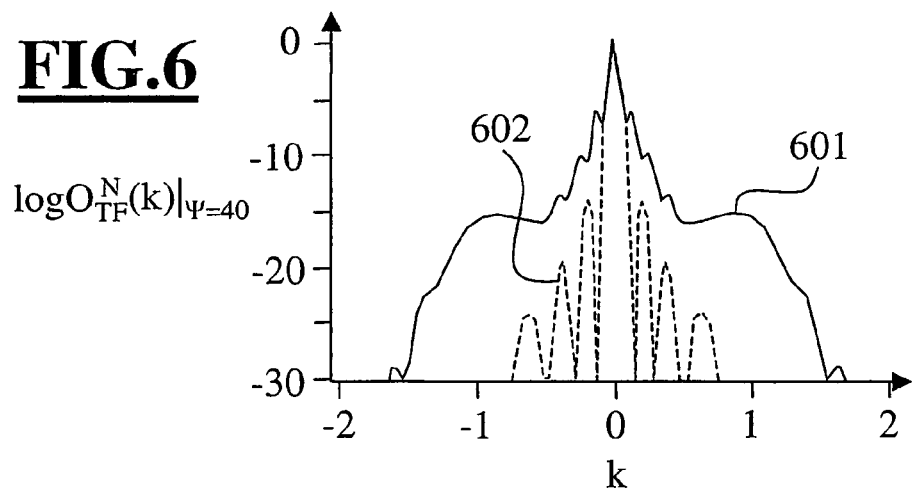
FIG. 6 is a graph showing the optical transfer function for the object plane of the object point of FIG. 5; and, FIG. 7 is a graph showing the interrelationship between the width of the point distribution function of an imaged object point and an offset of the object point from an ideal object plane in an optical imaging system of FIG. 1 for a beam path with a phase plate and a beam path without a phase plate.

FIG. 6 shows the course of the normalized optical transfer function $O_{TF}^N(k)|_{\psi=40}$ in dependence upon the spatial frequency k again corresponding to the illustration of FIG. 4 in a logarithmic plot. The curve 601 shows log $O_{TF}^N(k)|_{\psi=40}$ for a beam path having an optical phase plate and a beam path without an optical phase plate forms the basis of the curve 602. The curve 602 assumes segment-wise very small values. This means that for a beam path defocused in this manner, data is lost in the optical imaging. In contrast, the course of the curve 601 for a phase plate switched into the beam path corresponds substantially to the corresponding course of the normalized optical transfer function of FIG. 3 for a geometrically focused beam path. Accordingly, it is therefore possible to avoid a data loss in the imaging of object regions which are disposed at a spacing from a focal plane of an optical imaging system. In the optical imaging system of the surgical microscope 100 of FIG. 1, a gain in the depth of field can be achieved by introducing an optical phase plate 107 in the imaging of an uneven object region.

Figure 7:
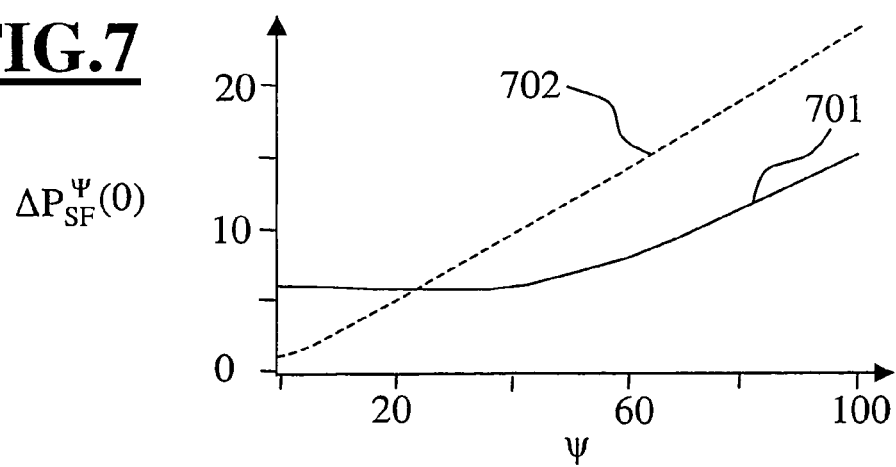

This subject matter is explained in greater detail with respect to FIG. 6. FIG. 7 shows a diagram wherein the width of the maximum $\Delta P_{SF}^{\psi}$ of the brightness distribution $P_{SF}^{\psi}(r)$ is plotted in dependence upon the distance 6 from the corresponding focal plane 110 of FIG. 1. The brightness distribution $P_{SF}^{\psi}(r)$ is caused by an object point in the intermediate image plane 104 by the optical imaging system of the surgical microscope 100 of FIG. 1. The curve 701 shows the course of $\Delta P_{SF}^{\psi}$ in dependence upon the distance parameter $\psi$ for the distance of an imaged object point from the object-end focal plane of the optical imaging system. The distance parameter $\psi$ and the real distance $\delta$ of the imaged object point from the focal plane are interrelated by the following relationship:

$$\delta = \psi \lambda / 6,$$

wherein: $\lambda$ is the wavelength of the imaging light. Accordingly, an imaging beam path with optical phase plate has, as a consequence, a loss in image sharpness for object points, which are disposed in the focus plane and in the vicinity of the focus plane, compared to a beam path without a phase plate. However, for object points, which are far remote from the object-end focal plane, the width of the brightness distribution of an individual imaged object point is less than the width of the corresponding brightness distribution for a beam path without an optical phase plate. By introducing an optical phase plate into the imaging beam path of an optical imaging system, the depth of field of an image can therefore be improved. It is especially possible, by using an optical phase plate, to sharply image an object region without brightness loss which would lead only to an unsharp, blurry intermediate image without optical phase plate in the limits of the geometric ray optics.

It is understood that the foregoing description is that of the preferred embodiments of the invention and that various changes and modifications may be made thereto without departing from the spirit and scope of the invention as defined in the appended claims.

What is claimed is:

1. An optical imaging system defining an optical beam path and comprising:

a beam deflecting unit for casting light rays out of an object region into an image plane;

an optical phase plate mounted in said optical beam path;

said phase plate being so configured that the Strehl ratio (H) of said system over a range of a distance parameter ($\psi$) is greater than the Strehl ratio of the system without said phase plate; and, a generating unit for generating a geometric image of said image plane.

2. The optical imaging system of claim 1, wherein said generating unit is configured as a unit for generating an image on the retina of a viewer's eye.

3. The optical imaging system of claim 1, wherein said phase plate is so configured that the Strehl ratio (H) of said system for a distance parameter ($\psi \geq 4$) is greater than the Strehl ratio of said system without said phase plate.

4. The optical imaging system of claim 1, wherein said optical phase plate imparts a phase offset ($\pi \leq \psi \leq 3\pi$) to a light ray passing through said phase plate.

5. The optical imaging system of claim 1, wherein said optical phase plate is designed to have a geometric phase deviation.

6. The optical imaging system of claim 1, wherein said optical phase plate is configured as a cubic phase plate.

7. The optical imaging system of claim 1, wherein said optical phase plate consists at least partially of glass.

8. The optical imaging system of claim 1, wherein said optical phase plate consists at least partially of plastic.

9. The optical imaging system of claim 1, wherein said optical phase plate consists at least partially of a glass substrate.

10. The optical imaging system of claim 1, wherein said optical phase plate includes a vaporized coating.

11. The optical imaging system of claim 10, wherein said vaporized coating on said phase plate has a thickness which varies locally.

12. The optical imaging system of claim 1, wherein said phase plate consists at least partially of an electrostatically deformable membrane.

13. The optical imaging system of claim 1, wherein said optical phase plate consists at least partially of a liquid crystal display.

14. The optical imaging system of claim 1, wherein said optical imaging system is designed for a microscope including a surgical microscope.

15. The optical imaging system of claim 1, wherein said optical imaging system has a resolution which is adapted to the resolution capacity of a human eye.

16. The optical imaging system of claim 1, wherein said phase plate can be moved into and out of said beam path.

17. An optical imaging system defining an optical beam path and comprising:
a beam deflecting unit for casting light rays out of a region of an object into an image plane;
an optical phase plate mounted in said optical beam path;
a generating unit for generating a geometric image of said image plane;
an objective lens mounted in said beam path;
said objective lens having a first side facing away from said object and a second side facing toward said object; and,
said optical phase plate being mounted on one of said sides of said objective lens.

18. The optical imaging system of claim 17, wherein said phase plate is so configured that the Strehl ratio (H) of said system over a range of a distance parameter ($\psi$) is greater than the Strehl ratio of the system without said phase plate.

19. The optical imaging system of claim 18, wherein said phase plate is so configured that the Strehl ratio (H) of said system for a distance parameter ($\psi \geq 4$) is greater than the Strehl ratio of said system without said phase plate.

20. The optical imaging system of claim 17, wherein said optical phase plate imparts a phase offset ($\pi \leq \phi \leq 3\pi$) to a light ray passing through said phase plate.

21. The optical imaging system of claim 17, wherein said optical phase plate is designed to have a geometric phase deviation.

22. The optical imaging system of claim 17, wherein said optical phase plate is configured as a cubic phase plate.

23. The optical imaging system of claim 17, wherein said optical phase plate consists at least partially of glass.

24. The optical imaging system of claim 17, wherein said optical phase plate consists at least partially of plastic.

25. The optical imaging system of claim 17, wherein said optical phase plate consists at least partially of a glass substrate.

26. The optical imaging system of claim 17, wherein said optical phase plate includes a vaporized coating.

27. The optical imaging system of claim 26, wherein said vaporized coating on said phase plate has a thickness which varies locally.

28. The optical imaging system of claim 17, wherein said phase plate consists at least partially of an electrostatically deformable membrane.

29. The optical imaging system of claim 17, wherein said optical phase plate consists at least partially of a liquid crystal display.

30. The optical imaging system of claim 17, wherein said optical imaging system is designed for a microscope including a surgical microscope.

31. The optical imaging system of claim 17, wherein said optical imaging system has a resolution which is adapted to the resolution capacity of a human eye.

32. The optical imaging system of claim 17, wherein said phase plate can be moved into and Out of said beam path.

33. An optical imaging system defining an optical beam path and comprising:
a beam deflecting unit for casting light rays out of an object region into an image plane;
an optical phase plate mounted in said optical beam path;
a generating unit for generating a geometric image of said image plane; and,
said optical phase plate being mounted in a region of said optical imaging system wherein the imaging beam path is parallel.

34. The optical imaging system of claim 33, wherein said phase plate is so configured that the Strehl ratio (H) of said system over a range of a distance parameter ($\psi$) is greater than the Strehl ratio of the system without said phase plate.

35. The optical imaging system of claim 34, wherein said phase plate is so configured that the Strehl ratio (H) of said system for a distance parameter ($\psi \geq 4$) is greater than the Strehl ratio of said system without said phase plate.

36. The optical imaging system of claim 33, wherein said optical phase plate imparts a phase offset ($\pi \leq \phi \leq 3\pi$) to a light ray passing through said phase plate.

37. The optical imaging system of claim 33, wherein said optical phase plate is designed to have a geometric phase deviation.

38. The optical imaging system of claim 33, wherein said optical phase plate is configured as a cubic phase plate.

39. The optical imaging system of claim 33, wherein said optical phase plate consists at least partially of glass.

40. The optical imaging system of claim 33, wherein said optical phase plate consists at least partially of plastic.

41. The optical imaging system of claim 33, wherein said optical phase plate consists at least partially of a glass substrate.

42. The optical imaging system of claim 33, wherein said optical phase plate includes a vaporized coating.

43. The optical imaging system of claim 42, wherein said vaporized coating on said phase plate has a thickness which varies locally.

44. The optical imaging system of claim 33, wherein said phase plate consists at least partially of an electrostatically deformable membrane.

45. The optical imaging system of claim 33, wherein said optical phase plate consists at least partially of a liquid crystal display.

46. The optical imaging system of claim 33, wherein said optical imaging system is designed for a microscope including a surgical microscope.

47. The optical imaging system of claim 33, wherein said optical imaging system has a resolution which is adapted to the resolution capacity of a human eye.

48. The optical imaging system of claim 33, wherein said phase plate can be moved into and out of said beam path.

* * * * *

UNITED STATES PATENT AND TRADEMARK OFFICE
CERTIFICATE OF CORRECTION

PATENT NO. : 7,209,293 B2 Page 1 of 1
APPLICATION NO. : 10/923004
DATED : April 24, 2007
INVENTOR(S) : Gerhard Gaida and Hans-Joachim Miesner It is certified that error appears in the above-identified patent and that said Letters Patent is hereby corrected as shown below:

Title Page:
Under (54):
Line 2: delete "EXPAND" and substitute -- EXPANDED -- therefor.
Item (56) Under OTHER PUBLICATIONS:
Line 2: delete "vol. 35," and substitute -- vol. 34, -- therefor.

Column 1:
Line 2: delete "EXPAND" and substitute -- EXPANDED -- therefor.
Line 30: delete "pre given" and substitute -- pregiven -- therefor.

Column 4:
Line 8: delete "$I_0$" and substitute -- I -- therefor.
Line 9: delete "I" and substitute -- $I_0$ -- therefor.

Column 10:
Line 7: delete "6" and substitute -- δ -- therefor.

Column 12:
Line 13: delete "Out" and substitute -- out -- therefor.

Signed and Sealed this

Third Day of July, 2007

JON W. DUDAS
*Director of the United States Patent and Trademark Office*